(12) United States Patent
van der Vegt et al.

(10) Patent No.: US 6,793,270 B2
(45) Date of Patent: Sep. 21, 2004

(54) SERVICE DOOR FOR A MOTOR VEHICLE

(75) Inventors: Herman van der Vegt, Utrecht (NL); Wouter Konings, Leiden (NL)

(73) Assignee: Thetford Corporation, Ann Arbor, MI (US)

( * ) Notice: Subject to any disclaimer, the term of this patent is extended or adjusted under 35 U.S.C. 154(b) by 0 days.

(21) Appl. No.: 10/435,939

(22) Filed: May 12, 2003

(65) Prior Publication Data

US 2003/0214150 A1 Nov. 20, 2003

Related U.S. Application Data

(60) Provisional application No. 60/379,914, filed on May 13, 2002.

(51) Int. Cl.[7] .................................................. B60P 1/00
(52) U.S. Cl. ........................ 296/156; 296/37.1; 49/504; 49/501
(58) Field of Search ............................. 296/156, 203.03, 296/146.1, 146.3, 146.5, 146.9, 168, 164

(56) References Cited

U.S. PATENT DOCUMENTS

| | | | | |
|---|---|---|---|---|
| 3,854,248 A | * | 12/1974 | Dayus ........................... | 49/504 |
| 3,858,355 A | * | 1/1975 | Root ............................ | 49/504 |
| 4,004,373 A | * | 1/1977 | Eschbach et al. .............. | 49/501 |
| 4,042,004 A | * | 8/1977 | Kwan ........................... | 49/501 |
| 4,783,116 A | * | 11/1988 | Hough .................. | 296/216.07 |
| 4,906,033 A | * | 3/1990 | Sargent et al. .............. | 296/37.1 |
| 5,016,949 A | * | 5/1991 | Knurr ......................... | 312/296 |
| 5,172,519 A | * | 12/1992 | Cooper ...................... | 296/37.1 |
| 5,325,633 A | * | 7/1994 | Magoon ...................... | 49/504 |
| 5,735,079 A | * | 4/1998 | Davlantes .................... | 49/504 |
| 5,746,466 A | * | 5/1998 | Antos et al. ................ | 296/37.1 |
| 5,771,644 A | * | 6/1998 | Kidd ........................... | 49/504 |
| 6,050,036 A | * | 4/2000 | Frey ........................... | 49/504 |
| 6,079,766 A | * | 6/2000 | Butler et al. ............. | 296/146.5 |
| 6,158,830 A | * | 12/2000 | Johnson et al. ............. | 312/218 |
| 6,286,274 B1 | * | 9/2001 | McKann et al. .............. | 49/505 |
| 6,295,779 B1 | * | 10/2001 | Canfield ...................... | 49/504 |
| 6,334,277 B1 | * | 1/2002 | Condino ...................... | 49/381 |
| 2003/0214150 A1 | * | 11/2003 | van der Vegt et al. ...... | 296/156 |

\* cited by examiner

*Primary Examiner*—Kiran Patel
(74) *Attorney, Agent, or Firm*—Harness, Dickey & Pierce, P.L.C.

(57) ABSTRACT

A service door assembly for a recreational vehicle including a sidewall defining an opening, the sidewall including an inner panel, an outer panel and a cavity therebetween filled with an insulation material. The service door assembly includes a door frame and a door. The door frame is adapted to be disposed in the opening. The door frame includes a plurality of integrally formed mounting tabs interconnected to a remainder of the frame through a living hinge. Each mounting tab is articulable between a first position and a second position such that in the second position a portion of the locking tab extends into the cavity of the sidewall. The door is mounted to the door frame. The door includes an inner member and an outer member connected with a securing arrangement integrally formed therewith. The securing arrangement includes an opening defined by the outer member of a pair of walls of the outer member and a mounting member integrally formed with the inner member. The mounting member includes first and second fingers spaced apart in a generally parallel relationship and a pin disposed between the first and second fingers. The pin is movable between a first and second position such that when the pin is in the second position it forces the first and second fingers into engagement with the walls of the first component and thereby retains the first and second fingers within the opening.

6 Claims, 8 Drawing Sheets

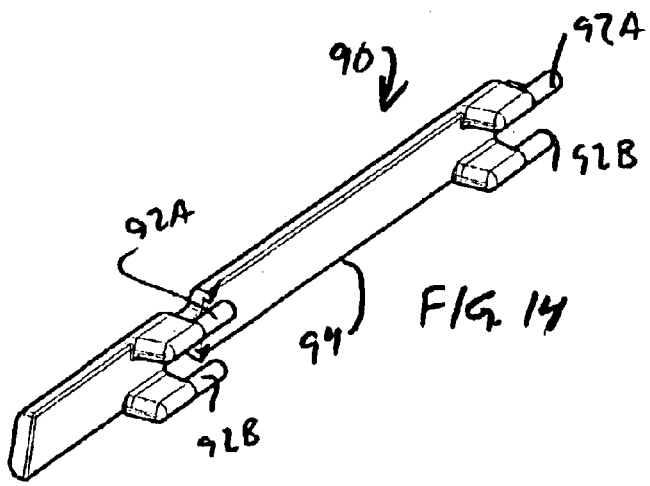
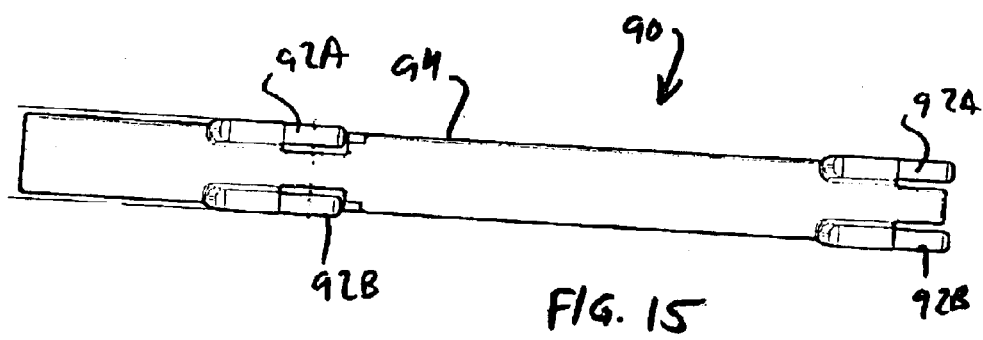

SERVICE DOOR FOR A MOTOR VEHICLE

CROSS-REFERENCE TO RELATED APPLICATIONS

This application claims the benefit of U.S. Provisional Application No. 60/379,914, filed on May 13, 2002.

FIELD OF THE INVENTION

This invention is related to doors for recreational vehicles (RVs) which are used to alternatively seal off and provide access to internal compartments and more particularly to an improved type of flush mounted service door assembly for a recreational vehicle which offers substantial improvements in appearance and assembly.

BACKGROUND OF THE INVENTION

Vehicles, including but not limited to recreational vehicles which are commonly referred to in the United States as RVs and in Europe as caravans, often incorporate exterior service doors for accessing internal compartments. For example, known service doors are shown and described in commonly assigned U.S. Pat. Nos. 5,746,466 and 4,906,033 which are hereby incorporated by reference as if fully set forth herein.

U.S. Pat. No. 5,746,466 discloses a service door assembly attached to a cutout in the side wall of a recreational vehicle for alternatively closing off and providing access to an internal compartment. A body frame of the service door assembly is attached to the cut out in the side wall. A door panel is attached by a hinge to the body frame. A pair of push button latch mechanisms, one of which contains an integrated lock, retains the door panel in the closed position. The door panel includes a separate door wall and inner and outer door frames which are joined by a retaining clip. The metal retaining clip has a return bent upon itself shape and pointed wedge shaped upset portions for joining the outer and inner door frames. The hinge is formed by portions of the frame and door panel that are flush with or recessed from the maximum protrusion distance of the door panel from the side wall, joined by a hinge pin that is not accessible when the door is closed and which is designed to break away if destructive forces are placed on the door assembly.

In U.S. Pat. No. 4,906,033, a service door arrangement is disclosed in which hinge members mount the upper end of the door member on the frame for up and down swinging movement between an open position disposed above the access opening and a closed position fitting in the opening. A continuous seal carried by the door engages the frame in order to maintain the compartment water tight. Separate latching and locking functions are incorporated in the door assembly and are separately accessed from side-by-side latch and lock members in the frame at a convenient position above the door.

While known service doors including those described above have proven to be satisfactory for their intended uses, a need exists to continually advance the pertinent art.

SUMMARY OF THE INVENTION

It is one general object of the present invention to provide a service door assembly having a reduced width frame that provides for an improved aesthetic appearance.

It is another object of the present invention to provide a service door assembly which reduces the required number of discrete fasteners for securing the door assembly to a recreational vehicle and for connecting components of the door assembly.

It is a related object of the present invention to provide a service door assembly having a frame with integrally formed locking tabs for engaging a sidewall of the recreational vehicle.

It is another related object of the present invention to provide a service door assembly having a door proper with inner and outer members, one of the inner and outer members being integrally formed to include a break-away element which can be hit with a hammer to operatively engage the inner and outer members.

It is another general object of the present invention to provide a service door assembly for a recreational vehicle having a reduced width frame which reduces required materials and enhances visual appearance.

It is a related object of the present invention to provide a service door assembly for a recreational vehicle having a door with inner and outer members with integrally molded attachment members to facilitate engagement and maintain a narrow profile.

It is yet another object of the present invention to provide a service door assembly for a recreational vehicle that latches at a plurality of spaced apart points.

In one form, the present invention provides a service door assembly for a recreational vehicle including a sidewall defining an opening, the sidewall including an inner panel, an outer panel and a cavity therebetween filled with an insulation material. The service door assembly includes a door frame and a door. The door frame is adapted to be disposed in the opening. The door frame includes a plurality of integrally formed mounting tabs interconnected to a remainder of the frame through a living hinge. Each mounting tab is articulable between a first position and a second position such that in the second position a portion of the locking tab extends into the cavity of the sidewall. The door is mounted to the door frame.

In another form, the present invention provides a securing arrangement of a service door assembly of a recreational vehicle for securing first and second components of the assembly in combination with the first and second components. The securing arrangement includes an opening defined by a pair of walls of the first component and a mounting member integrally formed with the inner member of the second component. The mounting member includes first and second fingers spaced apart in a generally parallel relationship and a pin disposed between the first and second fingers. The pin is movable between a first position and a second position such that when the pin is in the second position it forces the first and second fingers into engagement with the walls of the first component and thereby retains the first and second fingers within the opening. The securing arrangement functions to secure the first and second components of the assembly without the need for discrete fasteners.

Additional advantages and features of the present invention will become apparent from the following description and appended claims, taken in conjunction with the accompanying drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 14 is an enlarged perspective view of one of the hinge members of a hinge assembly of the present invention.

FIG. 15 is a front view of the hinge member of FIG. 14.

DETAILED DESCRIPTION OF THE PREFERRED EMBODIMENTS

The following description of the preferred embodiment of the present invention is merely exemplary in nature and is in no way intended to limit the invention, its application, or uses.

Figure 1:
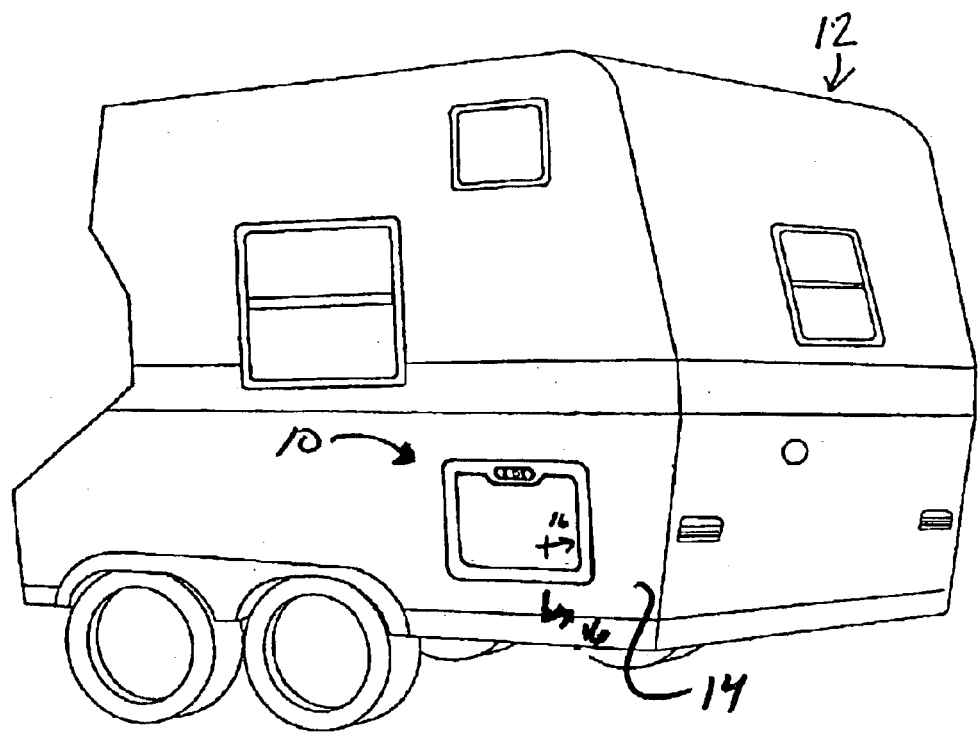
FIG. 1 is a perspective view of a recreational vehicle incorporating a service door assembly constructed in accordance with the teachings of a preferred embodiment of the present invention.

With initial reference to the environmental view of FIG. 1, a service door assembly constructed in accordance with the teachings of a preferred embodiment of the present invention is illustrated and generally identified at reference element 10. The service door assembly 10 is shown operatively associated with a recreational vehicle 12. It will be understood by those skilled in the art that the particular recreational vehicle 12 shown in the environmental view of FIG. 1 is merely exemplary and that the teachings of the present invention are applicable to other recreational vehicles, tractor trailers and virtually any other type of moving vehicle for which it is desired to provide an exterior service door for accessing external compartments. The service door assembly 10 is shown mounted within an opening (not particularly shown with respect to FIG. 1) of a sidewall 14 of the recreational vehicle 12.

Figure 2:
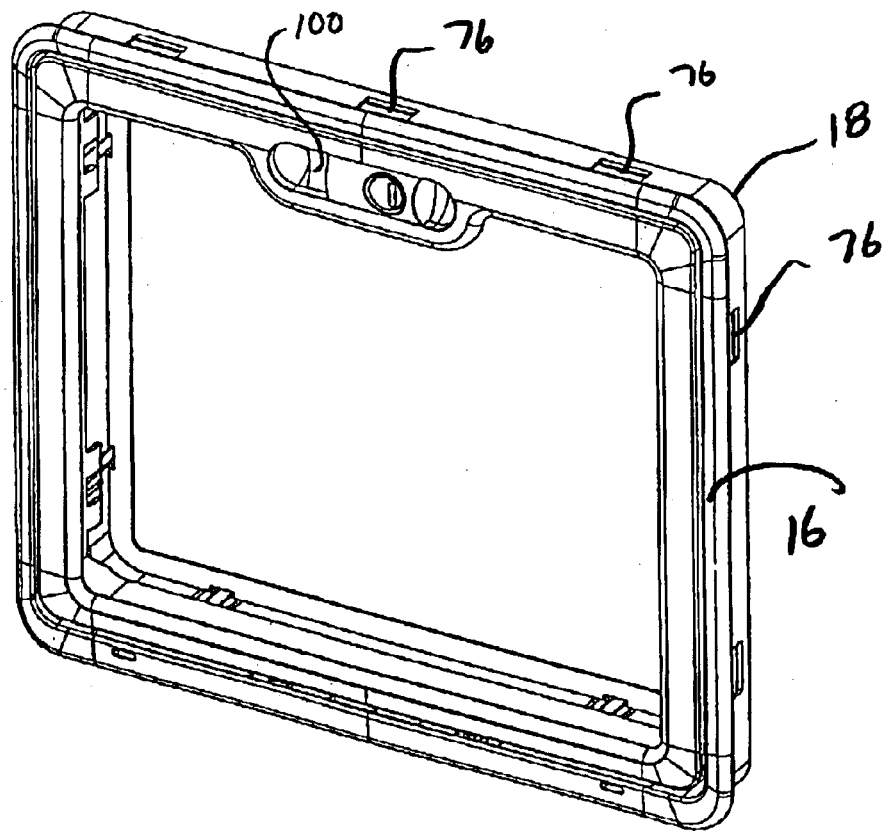
FIG. 2 is an enlarged perspective view of the service door assembly of the present invention shown removed from the recreational vehicle for purposes of illustration
Figure 3:
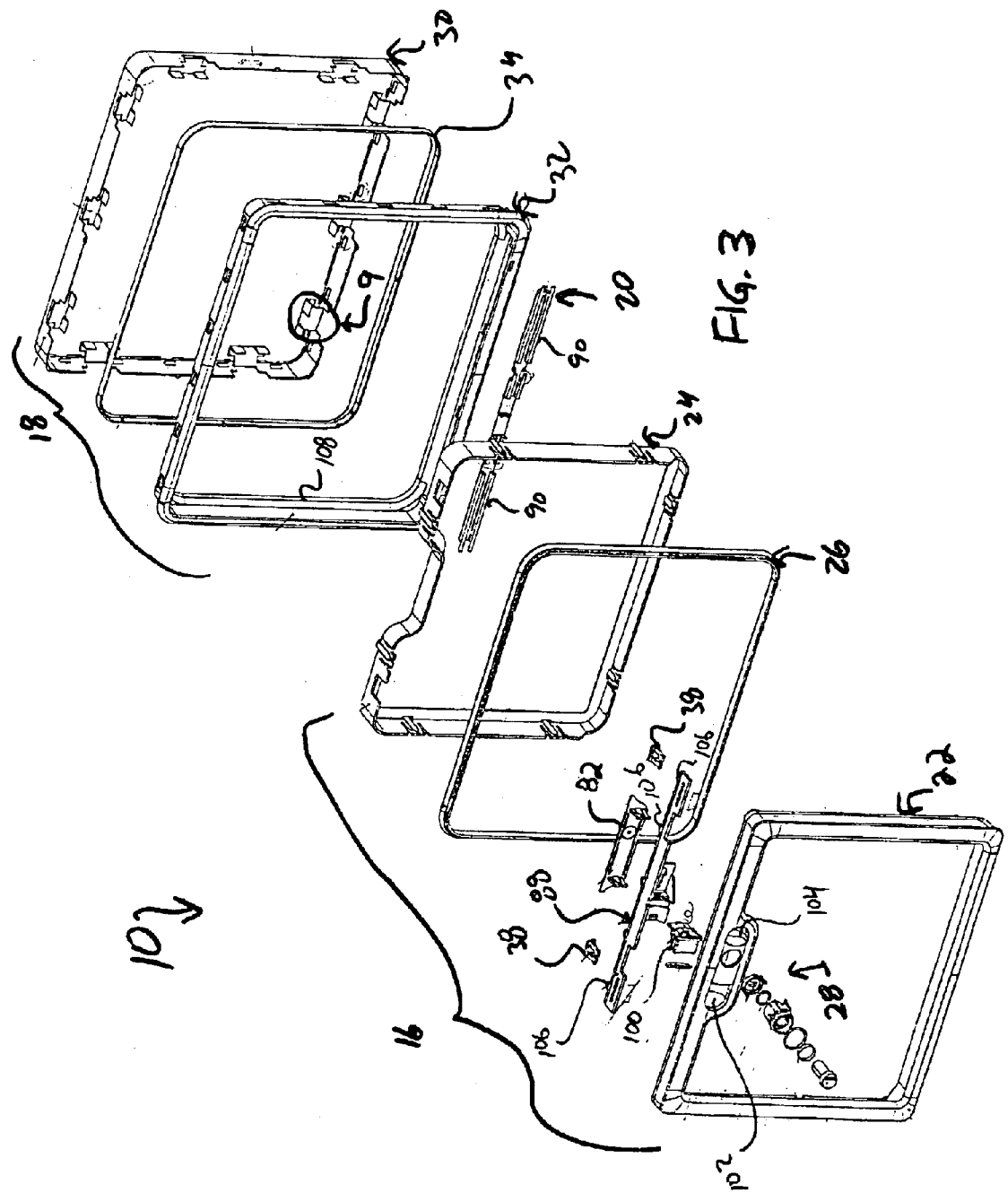
FIG. 3 is an exploded perspective view of the service door assembly of the present invention.

With continued reference to the environmental view of FIG. 1 and additional reference to FIGS. 2 and 3, the service door assembly 10 of the present invention is shown to generally include a door or door proper 16 and a frame 18. The door 16 and the frame 18 are connected by a hinge assembly 20. The hinge assembly 20 defines a pivot axis about which the door 16 can articulate relative to the frame 18 between an opened position and a closed position. The closed position is shown in the environmental view of FIG. 1. The open position is shown in the cross-sectional view of FIG. 18, for example.

Figure 16:
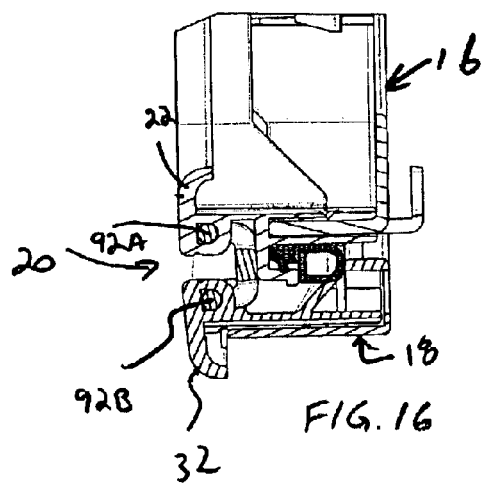
FIG. 16 is a cross-sectional view taken along lines 16—16 of FIG. 1, illustrating the door articulated to a closed position.

As shown in the cross-sectional view of FIG. 16, the door 16 is preferably a laminated structure having an inner wall 17, an outer wall 19 and a foam core 21. The door 16 is further shown to include an outer member 32 and an inner member 24 (see FIG. 3, for example). A seal 26 is captured between the outer and inner members 22 and 24. The door 16 is further illustrated to include a locking mechanism 28 for selectively securing the door 16 to the frame 18.

Figure 11:
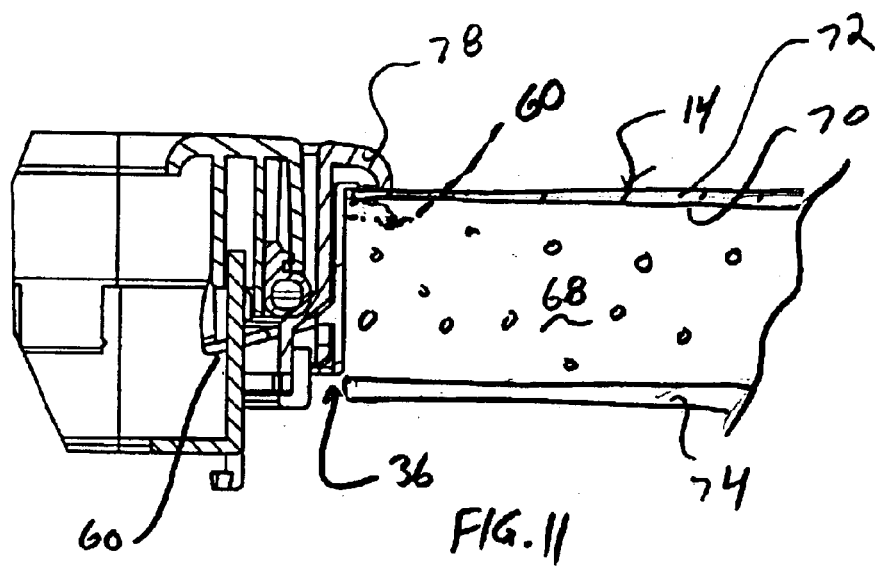
FIG. 11 is a cross-sectional view taken through a portion of the service door assembly of the present invention and an adjacent portion of a sidewall of the recreational vehicle, one of the integrally formed mounting tabs of the frame shown in solid lines prior to engagement with the sidewall and shown in hidden lines subsequent to engagement with the sidewall.

The frame 18 is illustrated to similarly generally include an inner member 30 and an outer member 32. Further similarly, a seal 34 is captured between the inner and outer member 30 and 32. In a manner to be more fully discussed below, the frame 18 is mounted within an aperture 36 (see FIG. 11) defined by the sidewall 14 of the recreational vehicle 12.

With additional reference to FIGS. 4–7C, the door 16 is shown to include a plurality of connecting members 38 for securely connecting the inner and outer member 22 and 24 of the door 16 without discrete fasteners. The connecting members 38 are preferably integrally formed with one of the inner and outer members 22 and 24 and in a manner discussed below are adapted to engage and be retained within openings 40 defined by the other of the inner and outer members 22 and 24 of the door 16. In the exemplary embodiment illustrated, the connecting members 38 are integrally formed with the inner member 24 of the door 16 and the cooperating openings 40 are defined by the outer member 22. Alternatively, it will become apparent to those skilled in the art that the door 16 could be designed such that the connecting members were integrally formed with the outer member 22 and the openings 40 defined by the inner member 24.

Figure 4:
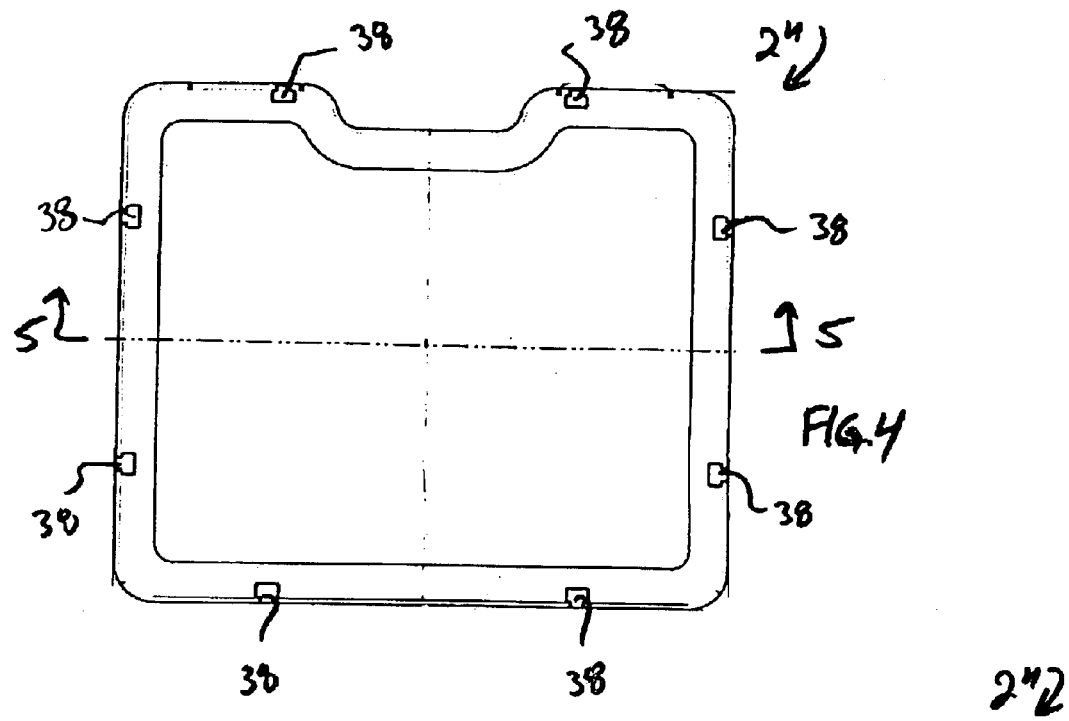
FIG. 4 is an enlarged front view of an inner member of the door of the service door assembly of the present invention.
Figure 5:
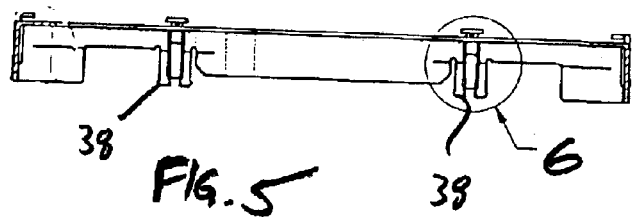
FIG. 5 is a cross-sectional view taken along the line 5—5 of FIG. 4.

As particularly shown in FIG. 4, the inner member 24 of the door is illustrated to include eight connecting members 38 spaced about the perimeter. Further in the preferred embodiment, each of the four sides of the inner member 24 are shown to include two connecting members 38. Those skilled in the art will readily appreciate that a greater or lesser number of connecting members 38 may be provided within the scope of the present invention so long as the connecting members 38 function to securely connect the inner and outer members 22 and 24 of the door 16.

In the particular embodiment illustrated, the connecting members 38 of the door 16 will be understood to be substantially identical to one another. For this reason, this detailed description need only to address one of the connecting members 38 for a complete understanding. As perhaps most particularly shown in the enlarged detailed view of the FIG. 6, each of the connecting members 38 includes first and second parallel and spaced apart fingers 42 and 44. Each connecting member 38 further includes a pin 46 positioned between the first and second fingers 42 and 44. The pin 46 is movable relative to the first and second fingers 42 and 44 between a first position and a second position.

Figure 6:
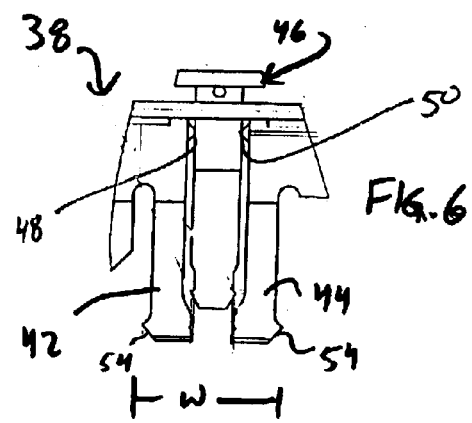
FIG. 6 is an enlarged view of the detail shown in circle 6 of FIG. 5.

The first position of the pin 46 relative to the first and second fingers 42 and 44 is a molded position and is shown, for example, in FIG. 6. In the first position, the pin 46 is connected to the first and second fingers 42 and 44 through breakaway connections at points 48 and 50, respectively. In the second position, which will be further described immediately hereafter, the pin 46 is moved downward relative to the first and second fingers 42 and 44 and the breakaway connection at the points 48 and 50 is destroyed.

Figures 7A, 7B, 7C:
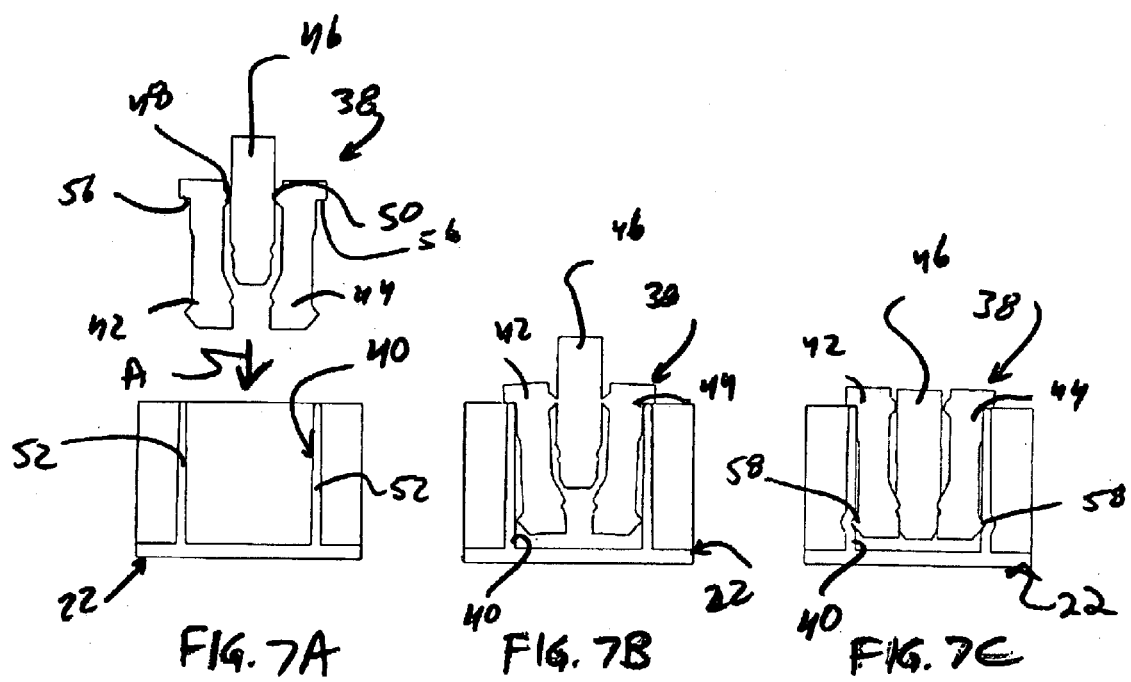
FIGS. 7A–7C represent a series of simplified views showing attachment of the door inner with the door outer.
Figure 8:
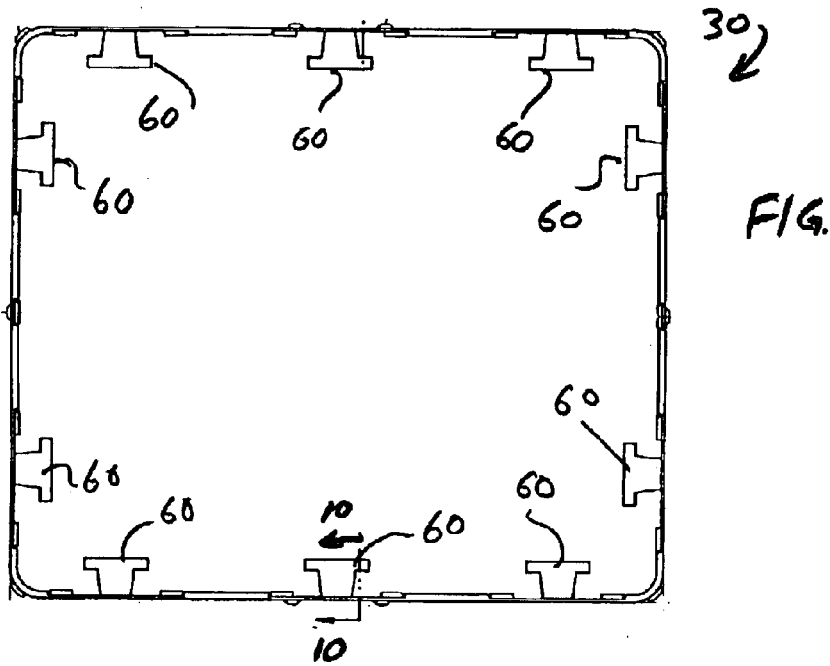
FIG. 8 is an enlarged side view of an inner member of the frame of the service door assembly of the present invention.
Figure 9:
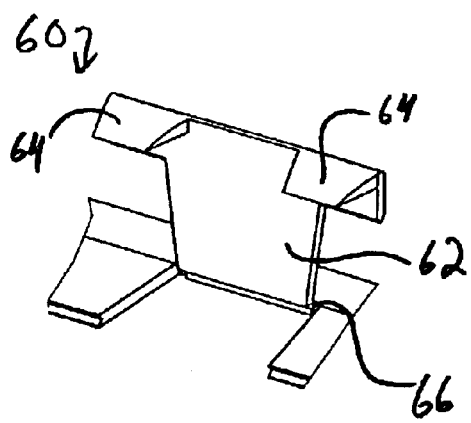
FIG. 9 is an enlarged view of the detail shown in circle 9 of FIG. 3.
Figure 10:
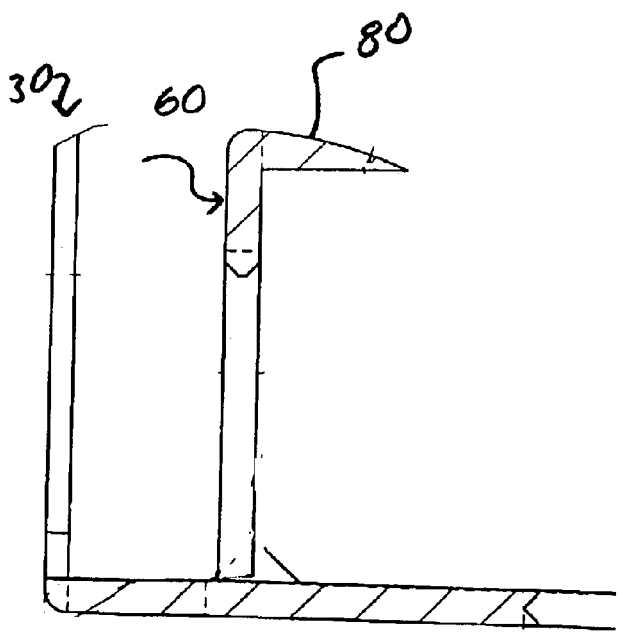
FIG. 10 is a cross-sectional view taken along the line 10—10 of FIG. 8.

With particular reference to the series of views provided at FIGS. 7A–7C, cooperation of one of the connecting members 38 with an associated opening 40 defined by the inner member 22 of the door 16 will be described. In FIG. 7A, the connecting member 38 is shown prior to insertion into the associated opening 40. The opening is defined by a pair of walls or fins 52. The fins 52 are substantially parallel to one another and spaced apart a distance which is slightly less than a maximum width w (see FIG. 6) of the first and second fingers 42 and 44. As shown particularly in FIG. 7B, upon insertion of the connecting members 38 in the direction of arrow A (see FIG. 7A), the free ends of the first and second fingers 42 and 44 are urged toward one another. This movement is facilitated by tapered lead-in surfaces 54 carried by the first and second fingers 42 and 44. Insertion of the connecting member 38 is limited by flanges 56 carried at the fixed ends of the first and second fingers which abut the free ends of the fins 52.

At this point of engagement between the connecting members 38 and the openings 40, the pin 46 is struck with a hammer or similar tool to destroy the breakaway connection at the points 48 and 50 and force a lower end of the pin between the free end of the first and second fingers 42 and 44. As resultantly shown in FIG. 7C, the first and second fingers 42 and 44 are returned to their initial parallel orientations and points 58 carried by the first and second fingers 42 and 44 engage the fins 52 to prevent withdrawal of the connecting member 38 relative to the opening 40.

With continued reference to the exploded view of FIG. 3 and additional reference to FIGS. 8–11, the frame 18 of the assembly 10 of the present invention is illustrated to include a plurality of integrally formed locking members or tabs 60. In the embodiment illustrated, the locking tabs are substantially identical and are integrally formed with the inner member 30 of the frame 18. Alternatively, it will be understood by those skilled in the art that the present invention can be adapted such that the locking tabs 60 are integrally formed with the outer member 32 of the frame 18. The locking tabs 60 function to secure the frame 18 to the sidewall 14 of the recreational vehicle 12 without the need for discrete fasteners.

In the particular embodiment illustrated, the inner member 30 of the frame 18 is formed to integrally include ten locking tabs 60. The locking tabs 60 are spaced about the perimeter of the inner member 30 of the frame 18 such that three locking tabs 60 are provided on each of the top and bottom sides of the inner member 30 and two locking tabs 60 are provided on each of the lateral sides of the inner 30. It will be understood by those skilled in the art that the particular number of locking tabs 60 is a matter of design choice and may be adjusted up or down within the scope of the present invention. It may be necessary to adjust the number of locking tabs 60 in response to factors such as the size of the frame 18, the construction of the recreational vehicle sidewall 14, and the like.

Each of the locking tabs 60 generally include a generally planar base portion 62 and a pair of prongs 64 depending from and generally perpendicular to the base portion 62. The base portion 62 is connected to the remainder of the inner portion 30 of the frame 18 through a living hinge 66. The living hinge 66 defines an axis about which each locking tab 60 articulates between a first position and a second position. The first position is shown, for example, in FIGS. 3, 9, 10 and in solid lines in FIG. 11. The second position is shown, for example, in hidden lines in FIG. 11. The locking tabs 60 articulate from their first positions to their second positions so to engage a foam core 68 provided in a cavity 70 defined between inner and outer panels 72 and 74 of the sidewall 14. This articulation from the first position to the second position also functions to securely connect the inner and outer members 30 and 32 of the frame 18. Explaining further, the prongs 64 of the locking tabs 60 extend through openings 76 (see FIG. 2) of the outer member 32 of the frame 18. The prongs 64 displace a portion of the foam core 68. The outer panels 72 of the sidewall 14 is effectively captured between the prongs 64 and a peripheral flange portion 78 of the outer member 32 of the frame 18. In the preferred embodiment, a surface 80 of the prong 64 positioned adjacent an inner side of the outer panel 72 has an arcuate shape to facilitate insertion of the prong 64 into the cavity 70 and also to wedge the outer panel 72 between the prongs 64 and the peripheral flange 78.

Figure 12:
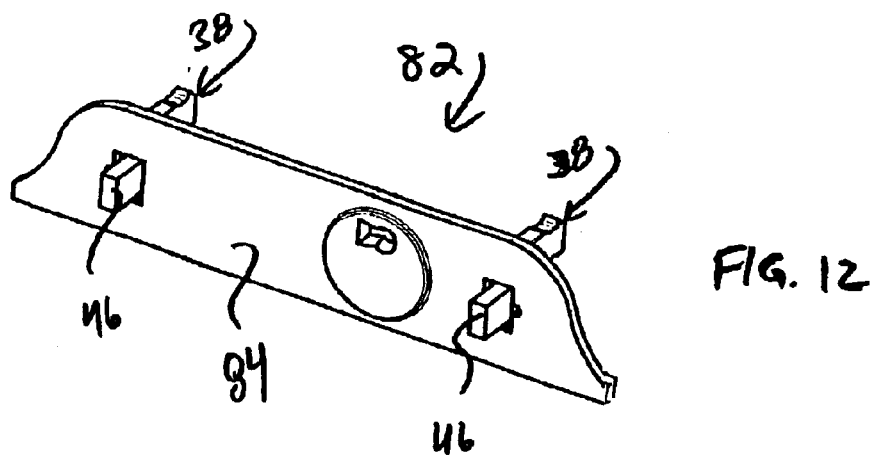
FIG. 12 is an enlarged perspective view of a cover plate of a locking mechanism of the service door assembly of the present invention.
Figure 13:
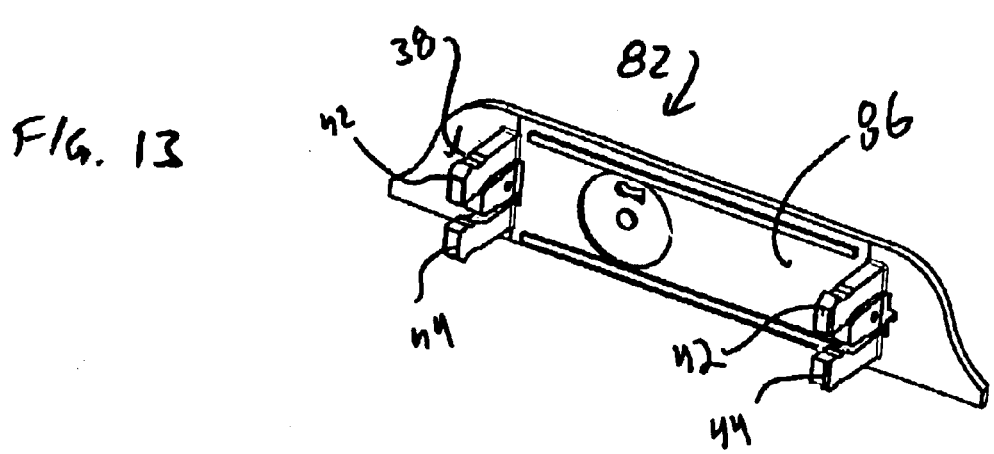
FIG. 13 is a rear perspective view of the cover plate of FIG. 12.

With reference to FIGS. 12 and 13, a cover plate 82 of the locking mechanism 28 of the assembly 10 is illustrated. The cover plate 82 is also shown in FIG. 3. In the embodiment illustrated, the cover plate 82 is shown to include a pair of integrally formed locking members 38 substantially identical to those described above in connection with the inner member 24 of the door 16. The head of the pin 46 of the locking members 38 extends from a rearward surface 84. The fingers 42 and 44 extend from a forward facing surface 86 of the cover member 82. The locking members 38 of the cover plate 82 engage apertures (not shown) defined by the outer member 22 of the door 16.

Substantially identical locking members are used to secure a sliding lock plate 88 of the lock assembly to the outer member 22 of the door 16. Different from those previously described, the locking members 38 are not carried by a component, but are rather discrete. The discrete locking members 38 pass through elongated apertures provided by the locking plate 88 and engage apertures (not shown) defined by the outer member 22 of the door 16 substantially as described above. In this matter, the locking plate 88 may slide relative to the outer member 22.

A button 100 is attached to the locking plate 88. The button 100 is normally biased along with the locking plate 88 to a latched position by a spring. The latched position is to the left direction in the drawings. The button 100 is manually movable to an unlatched position, again along with the locking plate 88, when the locking mechanism 28 is unlocked. The particular construction of the door assembly 10 allows for this movement from the latched to unlatched position to be accomplished with a single hand. In this regard, the user can insert his or her thumb into an aperture 102 adjacent the button 100 and his or her finger in a second aperture 104.

In the particular embodiment illustrated, the locking plate 88 is shown to include a plurality of tabs 106. As shown, the locking plate 88 includes five tabs 106. The tabs 106 cooperate with a corresponding number of apertures or slots (not particularly shown) carried by the outer member 32. The slots are provided in an upper side of an inwardly extending flange 108. When the button 100 and locking plate 88 are translated to the unlatched position, the tabs 106 align with the slots. In this position, the door proper 16 can be articulated to its open position. Upon releasing the button 100, the spring force translates the locking plate 88 to its latched position and the tabs 106 are positioned behind the flange 108. The plurality of tabs 106 at spaced apart positions along the locking plate 88 serve to secure the door proper 16 to the frame 18 in an improved manner. In this regard, the door proper 16 is secured along the length of an upper side of the frame 18.

As shown in FIG. 3, the hinge assembly 20 includes a pair of hinge members 90 that support the door 16 in a manner to be more fully described below. The hinge members 90 will be understood to be identical in all respects. With reference to FIGS. 14 and 15, an alternatively constructed hinge member 90' is shown removed from the door assembly 10. Both the hinge members 90 and 90' are shown to includes a plurality of hinge bars 92 connected by a generally planar plate 94. The primary difference between the hinge members 90 and the hinge members 90' is that the hinge bars 92 of the former are foreshortened. Otherwise, insofar as the present invention is concerned the hinge members 90 and 90' are identical.

The hinge bars 92 are generally parallel to and spaced from the plate 94. In the embodiments illustrated, the hinge bars 92 are four (4) in number and arranged in pairs. Each pair of hinge bars 92 have an upper hinge bar 92A and a lower hinge bar 92B.

Figure 17:
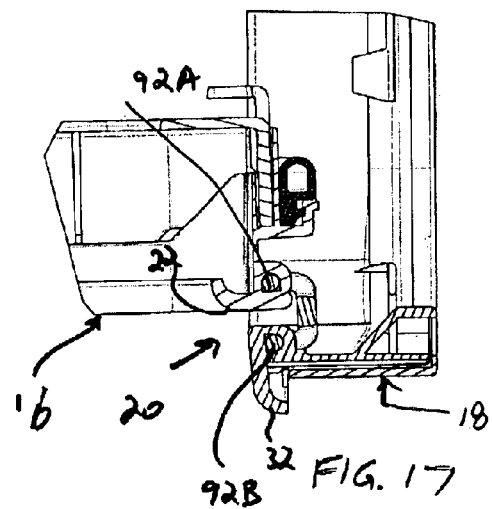
FIG. 17 is a cross-sectional view similar to FIG. 16 showing the door in a partially opened position in which it extends in a direction 90° to the sidewall of the recreational vehicle.
Figure 18:
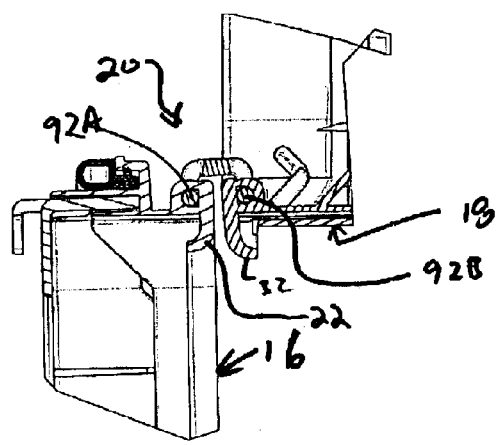
FIG. 18 is another cross-sectional view similar to FIG. 16 illustrating the door articulated to a fully opened position and extending in a direction parallel to the sidewall of the recreational vehicle.

With continued reference to FIGS. 3, 14 and 15, and additional reference to the cross-sectional views of FIGS. 16–18, the hinge assembly 20 will be further described. The upper hinge bars 92A are rotatably mounted on the outer member 22 of the door 16. The lower hinge bars 92B are rotatably mounted on the outer member 32 of the frame 18.

During assembly of the door assembly 10, a first one of the hinge members 90 or 90' is oriented with its hinge bars 92 extending in an outboard direction. The hinge bars 92 engage apertures defined by the door 16 and the frame 18 by moving the hinge member 90 in the outboard direction. This outboard direction is generally identified in FIG. 15 at arrow A. The second one of the hinge members 90 or 90' is oriented with its hinge bars 92 extending in an opposite direction. In a similar manner, the apertures defined by the door 16 and the frame 18 are engaged by the second hinge member 90 or 90' by moving the second hinge member 90 or 90' in this opposite direction. When the hinge members 90 or 90' are in place, adjacent ends abut one another to thereby prevent inboard movement. In some application, it may be desirable to incorporate a tongue and groove arrangement between the opposing ends of the hinge members 90 or 90'. The hinge members 90 or 90' are preferably constructed of plastic or other suitable material that may be inelastically deformed to facilitate assembly.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A service door assembly for mounting in an aperture of a sidewall, the service door assembly comprising: a door frame disposed in the aperture, the door frame including a plurality of integrally formed locking tabs interconnected to the frame through a living hinge, each locking tab being articulable between a first position and a second position such that in the second position a portion of the locking tab extends into the cavity of the sidewall; and a door mounted to the door frame.

2. The service door assembly of claim 1, wherein the door frame includes an inner member and an outer member, the plurality of locking tabs being integrally formed with one of the inner and outer members.

3. The service door assembly of claim 2, wherein the other of the inner and outer members includes a corresponding plurality of openings, each opening of the plurality of openings receiving an associated on of the plurality of locking tabs when the associated locking tab is articulated from the first position to the second position;

whereby the locking tabs further function to connect the inner and outer members of the door frame.

4. The service door assembly of claim 3, wherein the inner member of the door frame includes the plurality of locking tabs are integrally formed by the inner member of the door frame and the openings are defined by the outer member of the door frame.

5. The service door assembly of claim 1, wherein each locking tab of the plurality of locking tabs includes a generally planar main body portion and at least one prong extending in a direction substantially parallel to the generally planar main body portion.

6. The service door assembly of claim 1, wherein the service door is for a recreational vehicle.

* * * * *